Figure 1:
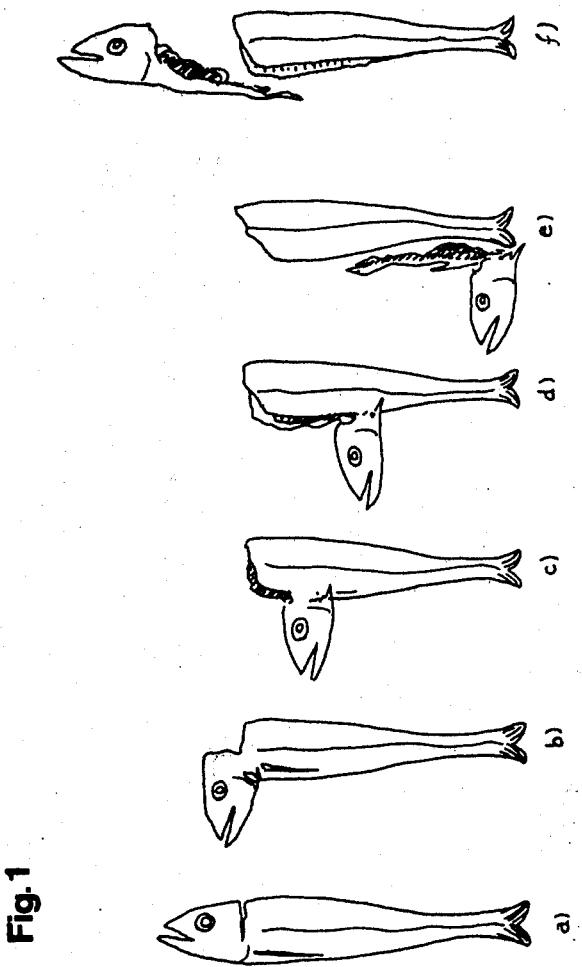

United States Patent [19]

Dafgard

[11] 4,307,491
[45] Dec. 29, 1981

[54] PROCESS AND AN APPARATUS FOR HEADING AND EVISCERATING FISH

[75] Inventor: Ingvar Dafgard, Helsingborg, Sweden

[73] Assignee: Societe D'Assistance Technique Pour Produits Nestle S.A., Lausanne, Switzerland

[21] Appl. No.: 92,691

[22] Filed: Nov. 9, 1979

[30] Foreign Application Priority Data

Nov. 10, 1978 [SE] Sweden .............................. 7811632

[51] Int. Cl.³ ............................................ A22C 25/14
[52] U.S. Cl. ......................................................... 17/60
[58] Field of Search ...................................... 17/60, 63

[56] References Cited

U.S. PATENT DOCUMENTS 3,947,921 4/1976 Berk ..................................... 17/60 X
4,215,452 8/1980 Nagrotzki ................................ 17/60

FOREIGN PATENT DOCUMENTS 377772 6/1923 Fed. Rep. of Germany .
230381 3/1925 United Kingdom ..................... 17/60
1066026 4/1967 United Kingdom ..................... 17/63

*Primary Examiner*—Willie G. Abercrombie
*Attorney, Agent, or Firm*—Vogt & O'Donnell

[57] ABSTRACT

The invention relates to a process and an apparatus for heading and eviscerating fish in which the head and the entrails are integrally removed from the body of the fish. According to the invention, only the neck of the fish is cut, after which the head is turned down through approximately 90° in relation to the axis of the body and, finally, the head undergoes a relative displacement along the body of the fish towards the rear thereof. As a result, the fish is completely eviscerated. The apparatus for carrying out the process essentially comprises a cutter for cutting the neck, a guide for turning down the body of the fish and two holders, one for the head and the other for the body of the fish, which receive different movements responsible for the above-mentioned displacement.

9 Claims, 15 Drawing Figures

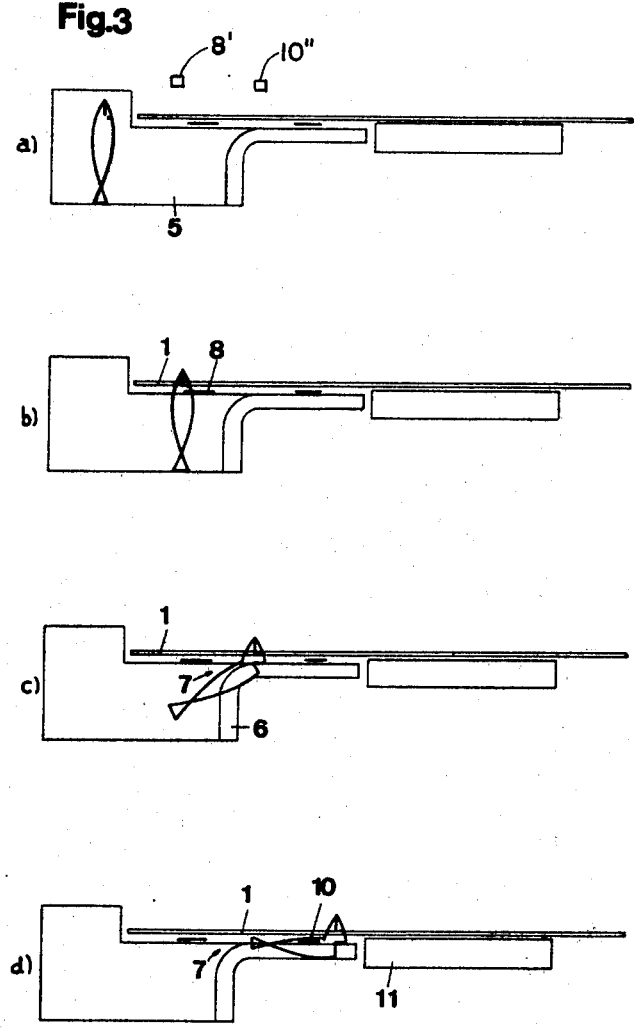

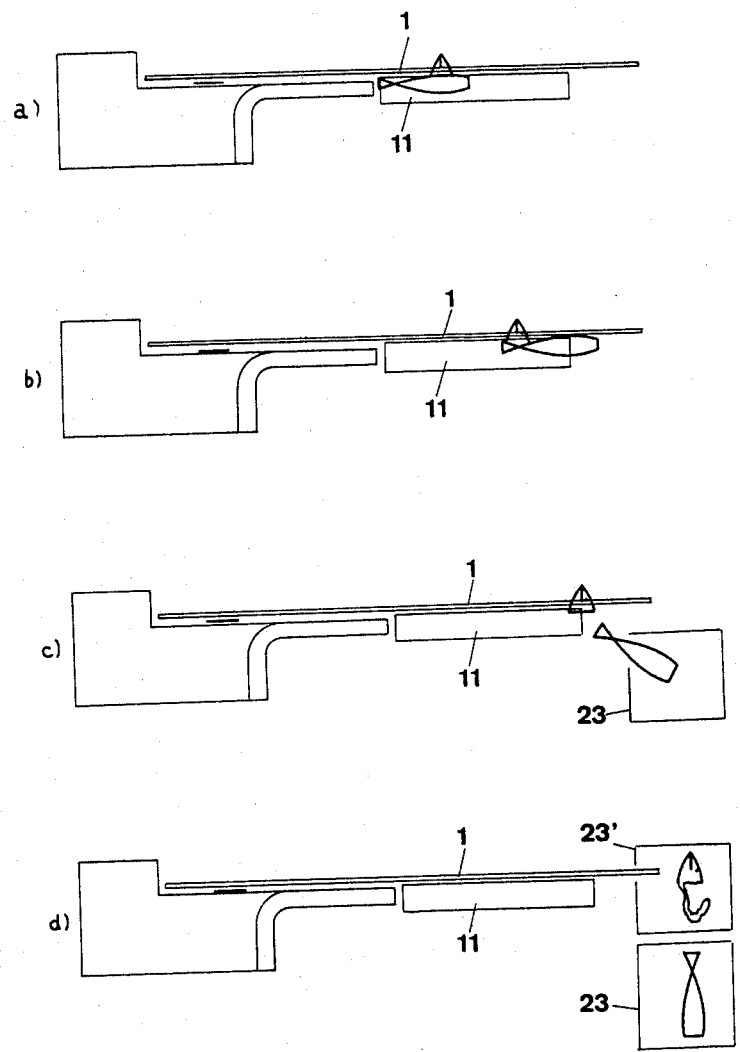

PROCESS AND AN APPARATUS FOR HEADING AND EVISCERATING FISH

This invention relates to a process for mechanically heading and eviscerating fish in which the entrails of the fish remain attached to its head and are withdrawn from the body of the fish during the heading operation. The invention also relates to an apparatus for carrying out the process according to the invention comprising means for cutting the neck of the fish disposed in the proximity of means for entraining the fish and mobile elements for respectively holding the body and the head of the fish during the heading operation.

In known processes and apparatus for heading and eviscerating fish, the neck and gullet of the fish are cut on either side of the digestive system of the fish, after which the head of the fish is removed from its body in an axial or radial movement relative to the axis of the body of the fish until the head is completely severed. In this case, however, evisceration of the fish remains incomplete.

The process and apparatus according to the present invention seek to provide a solution which ensures complete evisceration of the fish. The process according to the invention is characterised in that only the neck of the fish is cut, after which at least one of the two parts of the fish on one side or other of the cut is turned down so that they form a non-plane angle with one another and, finally, a movement is imparted to at least one of the two parts of the fish which results in a relative displacement of the head along the body of the fish towards the rear thereof. It may be advisable to point out that, as in known processes, the cutting of the neck cuts the backbone. The head and the entrails are progressively withdrawn so that the entrails subjected to the tractive effort are prevented from tearing.

In one preferred embodiment of the process, the angle formed between the turned-down head and body is substantially 90°. In another preferred embodiment, the neck is cut during a continuous movement of the still whole fish, in which case the relative displacement between the head and body is obtained either by momentary acceleration of the body or by momentary deceleration of the head of the fish. Finally, in another preferred embodiment, cutting of the neck may be followed or preceded by longitudinal incisions in the sides of the fish. In the treatment of mackerel for example, ventral incisions such as these have proved to be useful for fishes of above-average size.

The apparatus used to carry out the process according to the invention is characterised in that the entraining means is used to hold only one of the parts of the fish on one side or other of the neck and in that, along the entraining means, there are successively disposed a curved guide which forms a passage with the entraining means and means for holding the other part of the fish arranged parallel to the entraining means and mobile in relation thereto, mobile means for cutting the neck of the fish being additionally disposed in front of the passage formed by the guide and the entraining means.

The accompanying drawings illustrate the principle of the process according to the invention and one example of its practical application and of an apparatus for carrying it out. In these drawings:

FIGS. 1a–f diagrammatically illustrate the cutting of the neck, the lowering of the head and then its movement along the body of the fish until completely separated from the body.

Figure 2:
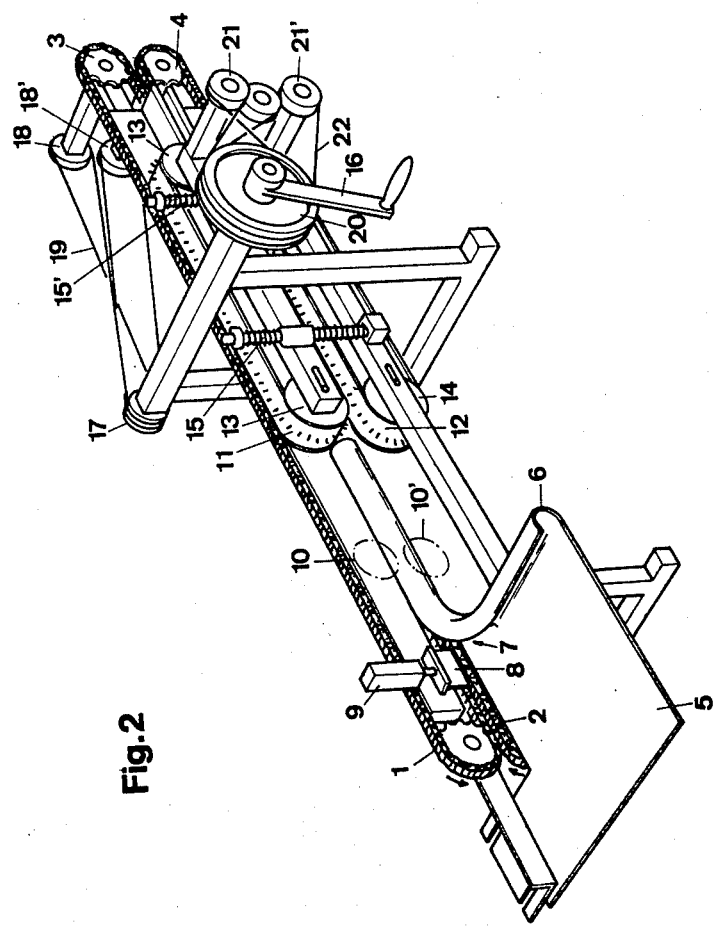

FIG. 2 is a perspective view, partly in section, of a preferred embodiment of the apparatus according to the invention.

FIGS. 3a–d and 4a–d are plan views diagrammatically illustrating the various stages involved in the treatment of a fish in the apparatus according to the invention.

In the embodiment illustrated in FIG. 2, the apparatus for carrying out the process comprises:

(a) means formed by a pair of stretched endless chains 1 and 2 each driven by pinions (3 and 4, respectively) arranged one above the other, these means forming a mechanical transfer in which the head of the fish is gripped between the upper part of the lower chain 2 and the lower part of the upper chain 1 to which a movement indicated by arrows is imparted, entraining the still whole fish;

(b) a plate 5 onto which the fish to be treated is delivered lying on its right-hand side, neck first, for example by means of a conveyor belt (not shown), and which is provided with a curved (concave) and angled guide 6 of which one end forms a passage 7 with the above-mentioned entraining means whilst its other end is substantially perpendicular thereto for receiving the fish delivered onto the plate 5;

(c) a cutter of which the blade 8 is vertically displaceable so that it is in its lower position on the arrival of a fish and is capable of ascending immediately after the neck of the fish has been cut, the blade being actuated by pneumatic means 9 automatically controlled by feeler device 8' situated near the cutter;

(d) two circular incision blades 10 and 10' capable of approaching one another during the passage of the body of a fish of which a feeler 10" will have detected an above-average size, said blades receiving a circular movement for the ventral incision and again being pneumatically controlled;

(e) means formed by a pair of stretched endless belts 11 and 12 each driven by pulleys (13 and 14 respectively) arranged one above the other, these means forming a mechanical transfer in which the body of the fish is gripped by the two endless belts 11 and 12, to which a simultaneous movement is imparted, and firmly held by spikes arranged on the endless belts, crushing of the body of a fish of above-average size being additionally avoided by an additional deflection of the two endless belts of which one is displaceable relative to the other on a rod fitted with springs 15,15';

(f) a drive element (represented here by a crank 16) and a system for transmitting the motive force on the one hand to the toothed wheels 3 and 4 of the entraining means by means of rollers 17, 18 and 18' connected to one another by at least one transmission belt 19, and on the other hand to the drive rollers 13 and 14 of the two endless belts by means of the pulley 20 and rollers 21 and 21' connected to one another by at least one transmission belt 22, said transmission system having the particular feature that the stepup ratio of the angular speed of the drive of the endless belts is greater than that of the entraining means.

The mode of operation of an apparatus according to the invention may be represented by the various stages of treatment of the fish: lying on one of its sides (in this case the right-hand side), the fish is delivered neck first onto the plate 5 (cf. FIG. 3a) and taken up by the entraining chains which carry it to the blade 8 where its neck is cut (cf. FIG. 3b). The fish then has the appearance shown in FIG. 1a, the blade 8 being removed so as not to cut the digestive system and gullet of the fish. While the head is entrained by the chains 1, 2, the body of the fish comes into contact with the guide 6 which turns it down towards the entraining means to make it enter the passage 7 (cf. FIG. 3c). Once its body has been turned down, the fish has the appearance shown in FIG. 1b. It is then carried (cf. FIG. 3d) towards the endless belt 11 and, if necessary, undergoes ventral and longitudinal incision by the circular blade 10. The body of the fish is then taken up by the endless belts 11 and 12 (FIG. 4a) of which the rate of advance is greater than that of the entraining chains 1 and 2 so that the head of the fish undergoes a relative movement along the body towards the rear of the fish, as shown in FIGS. 1c and d. When the body of the fish reaches the end of the endless belts (cf. FIG. 4b), its head and digestive system are completely detached therefrom, as shown in FIG. 1e. Since the speed of advance of the endless belts is greater than that of the entraining chains, the body of the fish is the first to be ejected from the apparatus (cf. FIG. 4c) and is collected in a box 23 or any other adequate means. The entraining means extended beyond the endless belts enables the head and digestive system to be collected in boxes 23' separate from those intended for the bodies of the fish and thus provides for sorting.

As shown in FIG. 2, the apparatus according to the invention is intended for the treatment of elongate rather than flat fish. However, an apparatus such as this has given entirely satisfactory test results in the treatment of mackerel, even when delivered in deep-frozen form.

It is obvious that the apparatus according to the invention is by no means limited to the embodiment described above. In particular, the blade 8 used to cut the necks may be activated electrically and released by an optical detector. Instead of making a vertical movement and being in the form of a guillotine, it may take a circular movement. For example, it may be in the form of a helical cutter of which the axis of rotation is parallel to the path followed by the fish on the conveyor belt and which is in synchronism with the conveyor belt so that, for one revolution of the helical cutter, the linear displacement of the fish on the conveyor belt corresponds to the pitch of the helix. This variant has the advantage of allowing a higher throughput. Similarly, the circular blades may be replaced for example by pointed blades incising the abdomen of the fish during its displacement. Depending on the species or the size of the fish being treated, these blades may be omitted or reduced to one only making a deeper incision. The endless belts 11 and 12 may be provided with grooves, ribs, teeth or other means for holding the body of the fish in place during removal of the head and digestive system. In the extreme case, the means provided on the supporting endless belt 12 will render the presence of a holding endless belt unnecessary. To ensure uniform and progressive removal of the head from the body, the means comprising the two endless belts is kept facing the entraining means by a frame ensuring the rigidity of the apparatus as a whole, although the opening of the passage 7 may be adjusted simply by shifting the plate 5 and the guide 6 relative to the entraining means to enable fish of above-average size to be treated. In the same vein, it is possible differently to adjust the mean interval between the chains 1 and 2 of the entraining means, between the endless belts 11 and 12 and between the co-operating blades. Finally, it is obvious that the movement of the entraining means and the endless belts may be obtained by any other means and, in particular, by one or more electric motors actuating them, the only requirement being that the particular means used should produce a relative "lagging" movement of the means holding the head in relation to the means holding the body.

One feature of the embodiment of the apparatus illustrated in the accompanying drawing lies in its simplicity of design and adjustment.

We claim:

1. An apparatus for heading and eviscerating fish in which the entrails of the fish remain attached to its head and are withdrawn from the body of the fish during removal of the head, which comprises:

entraining means (1,2) for holding the head of the fish, means (5, 6) for holding the body of the fish during the heading operation and being provided with a curved and angled guide (6) of which one end forms a passage (7) with the said entraining means (1, 2) whilst its other end is substantially perpendicular thereto, means (8) for cutting the neck of the fish, the fish being treated neck first lying on one of its sides, said cutting means (8) being disposed in front of the passage (7) formed by the guide (6) and the entraining means (1, 2), said guide (6) cooperating with the entraining means (1, 2) for effecting turning of the body of the fish down through an angle of substantially 90° once the neck has been cut, so that, on turning, the abdomen of the fish is facing the head entraining means (1, 2), and means (11, 12) for gripping the body of the fish arranged parallel to the entraining means (1, 2) and imparting a faster advance movement to the body of the fish than to its head to thereby produce a relative displacement of the head along the body of the fish toward the rear thereof.

2. An apparatus as claimed in claim 1, characterized in that the passage (7) has a width proportional to the thickness of the body of the fish to be treated.

3. An apparatus as claimed in claim 1, characterized in that the means for entraining the head is formed by a pair of endless chains (1, 2) arranged one above the other.

4. An apparatus as claimed in claim 1, characterized in that the means for gripping the body of the fish consists of a pair of endless belts (11, 12) arranged one above the other.

5. An apparatus as claimed in claims 1 or 4, characterized in that one of the endless belts (11) is displaceable in relation to the other through an elastic suspension (15, 15').

6. An apparatus as claimed in claims 1 or 4, characterized in that at least one of the endless belts (11, 12) is provided with spikes.

7. An apparatus as claimed in claims 1, 2, 3 or 4, characterized in that the means (1, 2) for entraining the head and the means (11, 12) for gripping the body are connected to a single drive element (16) by means of a transmission system (17, 20) with differential stepup of the angular speed for each of them.

8. An apparatus as claimed in claim 1, characterized in that a pair of displaceable blades (10, 10') arranged one above the other is arranged in a plane parallel to that of the entraining means (1, 2) within the passage (7) for longitudinally incising the abdomen of the fish.

9. An apparatus as claimed in claims 1 or 8, characterized in that the blade (8) for cutting the neck and the ventral incision blades (10, 10') are automatically controlled and provided with feelers (8', 10'') for respectively detecting the position and size of the fish.

* * * * *

UNITED STATES PATENT AND TRADEMARK OFFICE
CERTIFICATE OF CORRECTION

PATENT NO. : 4,307,491

DATED : December 29, 1981

INVENTOR(S) : Ingvar Dafgard

It is certified that error appears in the above—identified patent and that said Letters Patent is hereby corrected as shown below:

Column 3, line 37: "take" should read -- make --.

Signed and Sealed this

Fourth Day of May 1982

[SEAL]

Attest:

GERALD J. MOSSINGHOFF

*Attesting Officer*     *Commissioner of Patents and Trademarks*